United States Patent
Guendouz et al.

(10) Patent No.: US 8,382,187 B2
(45) Date of Patent: Feb. 26, 2013

(54) AUTOMATIC GAS CAP ACTUATOR WITH REDUNDANCY

(76) Inventors: Naim Guendouz, Onex (CH); Walter Dysli, Confignon (CH); Marc Jeanneret, Genève (CH)

( * ) Notice: Subject to any disclaimer, the term of this patent is extended or adjusted under 35 U.S.C. 154(b) by 1278 days.

(21) Appl. No.: 10/596,005

(22) PCT Filed: Feb. 25, 2005

(86) PCT No.: PCT/IB2005/000532
§ 371 (c)(1),
(2), (4) Date: Jan. 20, 2009

(87) PCT Pub. No.: WO2005/084987
PCT Pub. Date: Sep. 15, 2005

(65) Prior Publication Data
US 2009/0126827 A1 May 21, 2009

Related U.S. Application Data

(60) Provisional application No. 60/548,600, filed on Feb. 28, 2004, provisional application No. 60/631,708, filed on Nov. 30, 2004.

(51) Int. Cl.
*B60K 15/04* (2006.01)
(52) U.S. Cl. ............ 296/97.22; 220/86.2; 141/348
(58) Field of Classification Search .......... 141/348–350; 220/86.2; 296/97.22
See application file for complete search history.

(56) References Cited

U.S. PATENT DOCUMENTS
2,169,656 A 8/1939 McNeely
(Continued)

FOREIGN PATENT DOCUMENTS
| DE | 195 17 542 A1 | 11/1996 |
| EP | 0 582 025 A | 2/1994 |
| EP | 0 704 331 A | 4/1996 |
| EP | 1 090 796 A | 4/2001 |

(Continued)

OTHER PUBLICATIONS http://www.inergyautomotive.com/httpdocs/public/inergy_contlib.php?maPage=36&maRub=3, Capless, (2007).

(Continued)

*Primary Examiner* — Gregory Huson
*Assistant Examiner* — Nicolas A Arnett
(74) *Attorney, Agent, or Firm* — Da Vinci Partners LLC (57) ABSTRACT

An automatic gas cap actuator system (10, 10') for automatic locking and opening of the gas cap (26, 74) of a vehicle's fuel tank is provided. The system (10, 10') has a gas cap (26, 74); and a cap actuator (16, 20, 48, 48'; 72) actuated by a non-manual power source (12, 12'). The cap actuator interfaces with the gas cap (26, 74) via an interface (39, 76) in a manner so as to be able to impart relative rotation between the gas cap and a fixing element (20, 78), so as to draw the cap into engagement with the filling tube (34, 52), the interface and the gas cap being disengageable so as to permit manual use at the will of the operator. A remote controller within reach of a vehicle operator actuates the motor (12, 12'). In an advantage, the cap (26, 74) can be locked or opened both electrically and manually. Using the electrical unlock, the cap (26, 74) unlocks and opens without any necessary manual intervention. Thus, using the invention, the user finds the orifice (34, 52) that leads to the gas tank already open and ready for the insertion of the pump's filling tube. The system (10, 10') decreases the filling time and increases the cleanliness of the filling operation. When fueling is complete, all that is necessary is that the fueling door (46, 62) be closed to begin the actuation of the gas cap (26, 74) to its closed position.

20 Claims, 11 Drawing Sheets

U.S. PATENT DOCUMENTS

| | | | | |
|---|---|---|---|---|
| 5,066,062 A | * | 11/1991 | Sekulovski | 296/97.22 |
| 5,072,986 A | * | 12/1991 | Tai et al. | 296/97.22 |
| 5,234,122 A | * | 8/1993 | Cherng | 220/86.2 |
| 5,253,920 A | * | 10/1993 | Eldridge | 296/97.22 |
| 5,544,780 A | * | 8/1996 | Jye | 220/86.2 |
| 5,732,842 A | * | 3/1998 | Krause et al. | 220/86.2 |
| 6,035,906 A | | 3/2000 | Ott | |
| 6,234,555 B1 | * | 5/2001 | Emmerich et al. | 296/97.22 |
| 6,234,557 B1 | | 5/2001 | Bae | |
| 6,834,688 B2 | * | 12/2004 | Ono et al. | 220/86.2 |
| 2005/0039818 A1 | * | 2/2005 | Bauer | 141/301 |

FOREIGN PATENT DOCUMENTS

EP    1 464 529 A    10/2004

OTHER PUBLICATIONS http://www.worldcarfans.com/news.cfm/newsID/2060810.002/country/acf/ford/ford-capless-fuel-filler, Ford Capless Fuel Filler (Oct. 8, 2006).

Bonsor, How the Volvo "Your Concept Car" Works, http://auto.howstuffworks.com/voivo-concept.htm, (2004).

* cited by examiner

AUTOMATIC GAS CAP ACTUATOR WITH REDUNDANCY

CROSS REFERENCE TO RELATED APPLICATIONS

This Application claims priority to U.S. provisional applications 60/548,600 and 60/631,708 of the same title, filed on Feb. 28, 2004 and Nov. 30, 2004, respectively, the content of which is hereby incorporated by reference herein.

BACKGROUND OF THE INVENTION

This invention relates to fuel tank gas caps, and, more particularly, to gas caps with some sort of assisted opening and closing device.

U.S. Pat. No. 6,035,906, the content of which is incorporated herein by reference, shows a self-closing cap for the fuel filler neck of a vehicle which is particularly adapted for use with an automatic gas tilling machine. The cap comprises a closure ring having an annular body and screw threads or bayonet lugs for detachably mounting the periphery of the annular body around the open end of the filler neck, and a closure flap assembly formed from a circular member with a nozzle receiving opening, a closure flap spring biased over the opening, and a pivotal mounting connecting the flap over the opening. The closure flap assembly includes a locking ratchet mechanism for securing the circular member over the closure ring in a selected angular position such that: the pivotal mounting is substantially 180 DEG opposite from the pivotal connection of the restrictive flap within a filler neck of a vehicle to allow a fuel nozzle from an automatic gas filling machine to be smoothly inserted into and withdrawn from the self-closing cap. The cap has a cover that snap-fits over the closure flap assembly. The top wall of the cover serves as an inclined guide face for guiding the nozzle of an automatic gas filling machine into the opening of the closure flap assembly. An overpressure valve assembly is incorporated into the circular member for releasing vapor and gases from the vehicle fuel tank when the pressure in the tank approaches a tank-rupturing level.

U.S. Pat. No. 2,169,656 describes an early system which provides for automatic opening using an electric unlock mechanism for a spring-biased-to-open cap. Although manual opening and closing is possible, the closing operation involves touching the cap, and the electrical system is grounded with the fuel tank, thus presenting a solution that is somewhat lacking from a view of safety. Further, this solution does not provide for conventional sealing of a rotatable cap.

What is needed is an actuator that permits both automatic and manual opening and closing of a fuel tank and further, essentially hands-free, hygienic operation. In particular, what is needed is a system that permits manual and automatic opening in a conventionally sealing gas cap.

SUMMARY OF THE INVENTION

An automatic gas cap actuator is provided for automatic locking and automatic opening of the gas cap of a vehicle's fuel tank. The actuator is made up of an intermediate ring having a worm gear on its periphery which acts as an intermediary between the cap and the filling tube. A motor located in a recess or fixed on the filling tube activates this component by means of a worm drive.

In an alternate embodiment, the cap interfaces with both a fuel ingress tube and an actuator for turning the cap in either an opening or a closing direction. The gas cap rotatably joins a fueling door or trap door hinged to the body of the vehicle. The actuator is made up of a hub fixed on a disc having a worm gear on its periphery. A reversible electric motor carries a worm which interfaces with the worm gear. A control (or remote control) within reach of a vehicle operator actuates the electric motor. The interface releasably mates with the gas cap, such that the cap can be disengaged from the actuator for manual closing of the fuel tank.

In an advantage, the cap can be locked or opened both electrically and manually.

In another advantage, using the electrical unlock, the cap unlocks and the gas cap opens without any necessary manual intervention.

In another advantage, using the invention, the user finds the orifice that leads to the gas tank already open and ready for the insertion of the pump's fuel spout. This guarantees a less time consuming and cleanly filling operation.

In another advantage, when fueling is complete, all that is necessary is that the fueling door be closed to begin the actuation of the gas cap to its closed position which may take place remotely as well.

An object of the invention is to provide a simple, hygienic, and redundant manual and electrical system for opening or closing a fuel tank's gas cap.

DETAILED DESCRIPTION OF THE PREFERRED EMBODIMENT

Figure 1:
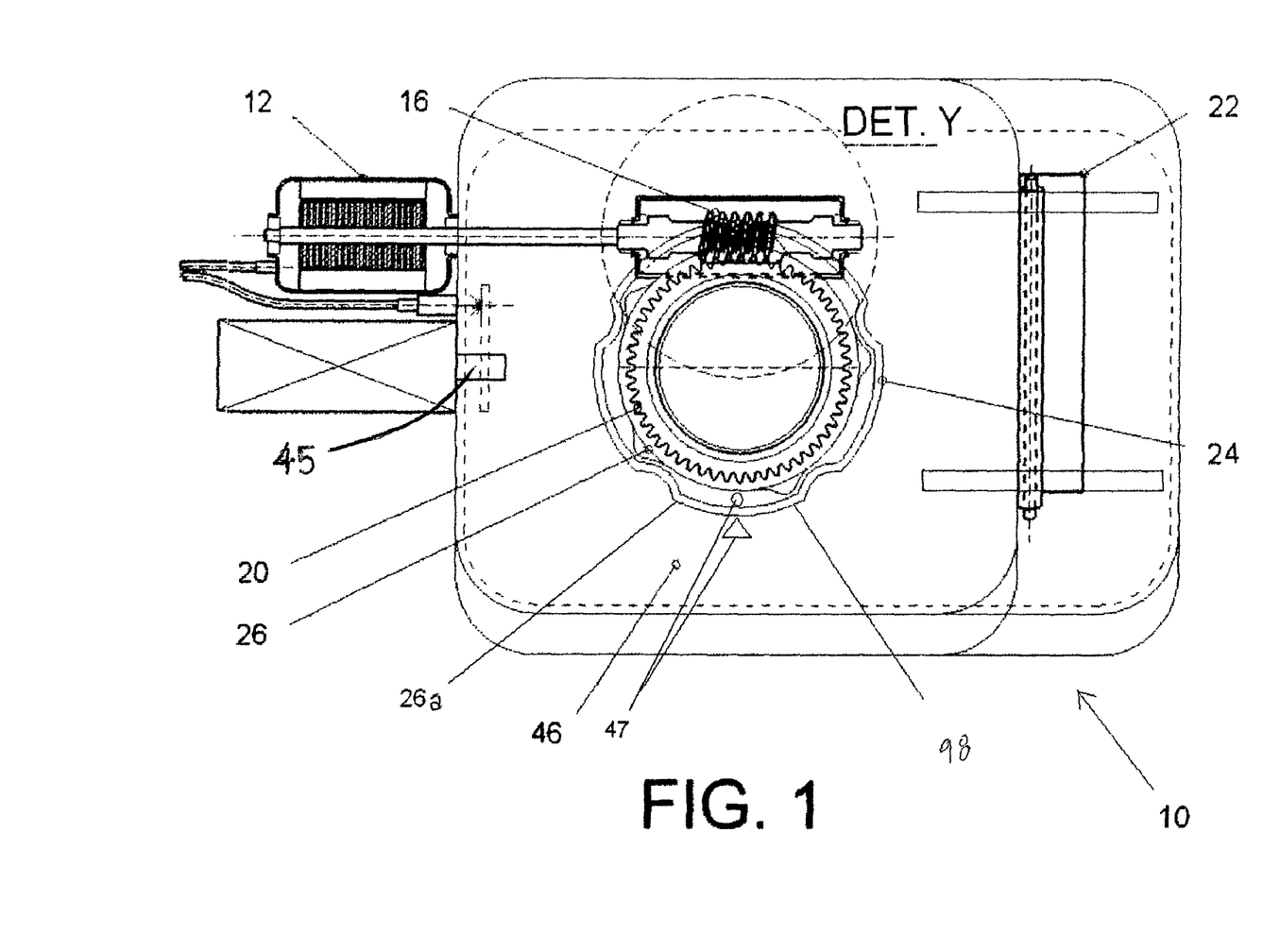
FIG. 1 is a schematic, partially transparent side view of the system showing the gas cap in a closed position.
Figure 3:
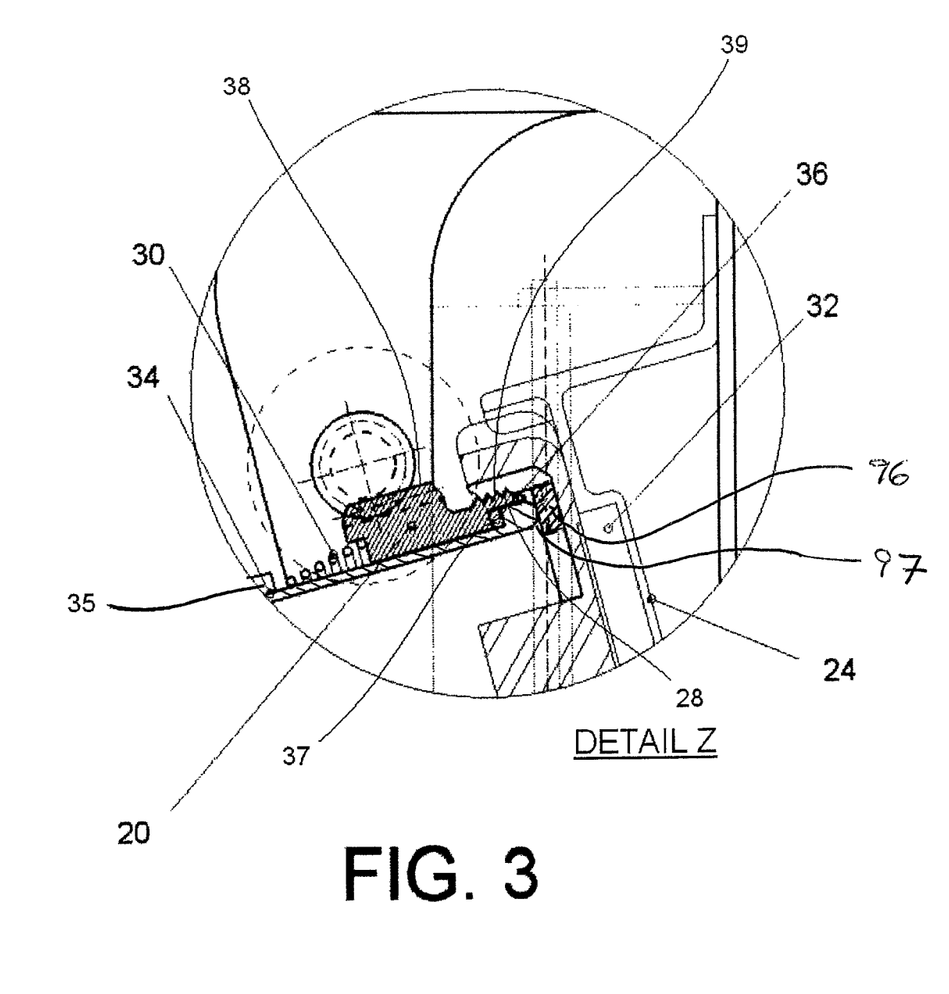
FIG. 3 is a detail view of region Z of FIG. 2a, showing of the linking component of the invention which enables the locking and unlocking of the cap.

Referring now to FIG. 1 and FIG. 3, a system 10 for automatically opening and closing the cap 26 of a gas tank. The automation is realized by the rotation of a linking ring 20 which acts as an intermediary between the cap 26 and the filling tube 34. A motor 12 located in a recess 48, or fixed on the filling tube 34 activates this component by means of a worm drive 16. Note that the motor 12 may be driven electrically, hydraulically, or pneumatically.

The linking ring 20 is an independent component which encircles the upper portion of the filling tube 34. The ring 20 has a diameter greater than the diameter of the filling tube 34 in order to permit the ring to slidingly fit around the filling tube. The external periphery of one end has teeth 38 which engage with the worn 16 driven by the motor 12. The external face of an opposite end comprises a standard thread or a bayonet thread 39 (of a bayonet system or any other suitable system having the purpose of interfacing with the cap 26). This thread 39 is preferably a nonclassic bayonet thread which makes the connection between the cap 26 and the filling tube 34 merely by turning (no axial motion required in order to release the bayonet to permit turning) in order to permit, depending on the rotational direction, the opening or closing of the tank.

The cap 26 has a corresponding standard thread or bayonet thread 28 disposed on the internal face. A quick connection and release device such as an electro or ferro magnetic 32, or hook-and-loop fastener, ie., "VELCRO"™-type interface 75 is disposed in the cap 26 permitting it to be held in place by the magnet 32 (corresponding ferro or electro magnets) found in the guidance sleeve or boot 24 of the gas tank trap door 46.

Further, the cap 26 is formed to include an external gripping surface 98 having, for example, bosses 26a that facilitate opening by hand and which lock the cap into a guidance sleeve 24. Part of the cap 26 which penetrates into the linking ring 20 may be formed with a chamfer (not shown) in such a manner that its insertion in the linking ring 20 is facilitated in the event that the cap 26 is not properly aligned with the linking ring 20.

As already mentioned, the cap 26 is attached to the trap door 46 by magnetic means 32 or by other means, such as by the <<VELCRO>>™ interface, in the guidance sleeve 24. When the cap 26 is freed from the thread 39 and thus from the linking ring 20, the trap door 46, with the cap 26 fixed to it, opens via the spring 90 or other actuator associated with the hinge 22 and frees the filling tube to enable fueling.

When the user closes the trap door 46, the cap 26 engages on the thread or bayonet system 39 from the linking ring 20 which, driven by the motor 12, drives the system to a locked configuration. The cap 26 may also be detached manually from the trap door 46 in order to close the filler tube manually.

The motor 12 drives the worm 16 which is held in operational relationship to the linking ring 20 bit a frame 42. The worm 16 activates the toothed part of the linking ring 20.

Figure 2A:
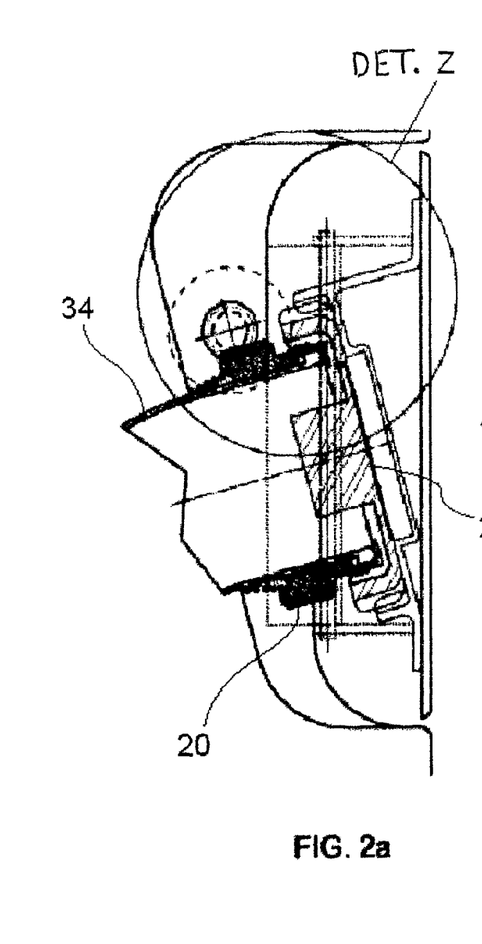
FIGS. 2a-2c are side, cross-sectional views of the invention in three stages of operation, locked, unlocked open.
Figure 2B:
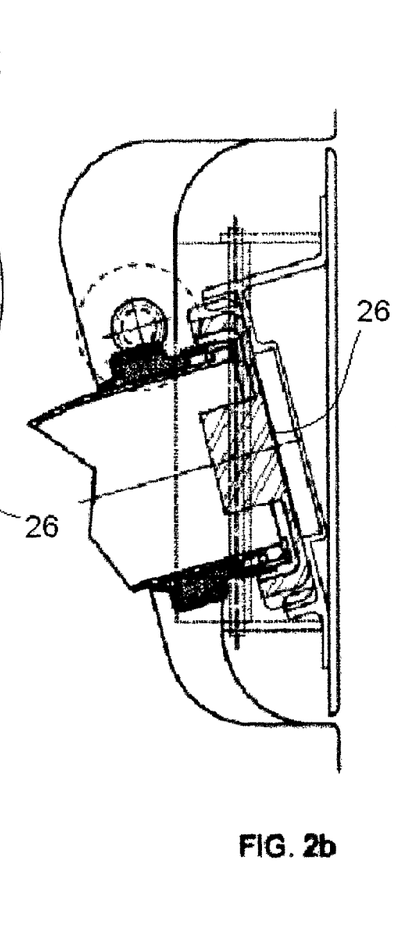
Figure 2C:
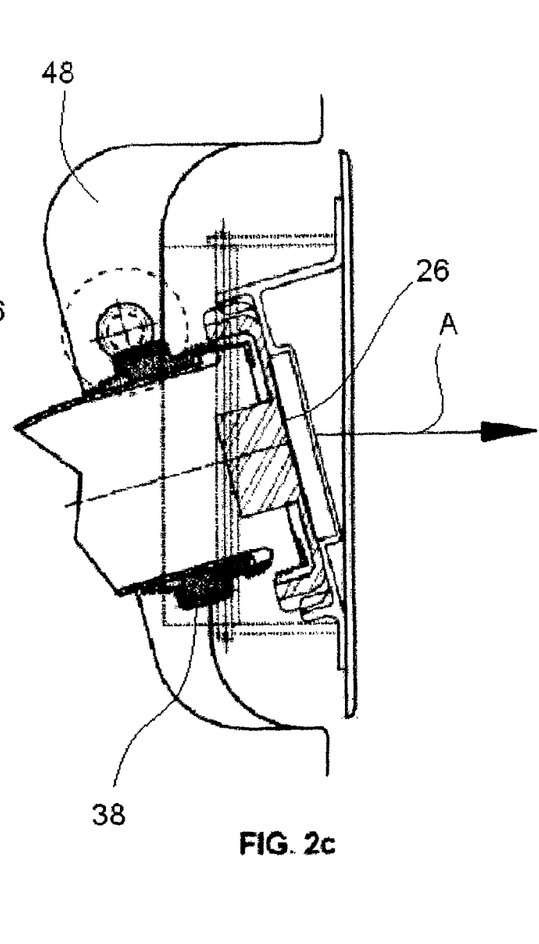

Referring now Lo FIGS. 2a to 2c, the three phases of the opening process are shown. In FIG. 2a, the locked phase is shown, in which the cap 26 is fully threaded onto the ring 20. In FIG. 2b, the unlocked phase is shown, in which the cap 26 is just unthreaded from the ring 20. In FIG. 2c, the open phase is shown, where an arrow A indicates the direction in which the cover and cap move in relation to the spout 34 and ring 20.

Referring now to FIG. 3, a locked position is shown in close up. It is apparent that the thread 39 which is located on the upper part of the linking ring 20 is screwed into the interior of the cap 26. Rotation of the thread 39 on the linking ring 20 permits the opening and closing of the system by disengaging and engaging the linking ring 20 from and with the cap 26 without having to physically turn the cap.

The linking ring 20 is interposed between the cap 26 and a coil spring 30, which biases the ring into contact with the cap 26 and permits the ring to axially move along the filling tube 34 between a stop 35 and a flange 37 which define the limits of motion of the cap. A low friction o-ring seal 36 protects the filling tube 34 from the upper part of the linking ring 20 as well as helps to seal the system 10.

Figure 4:
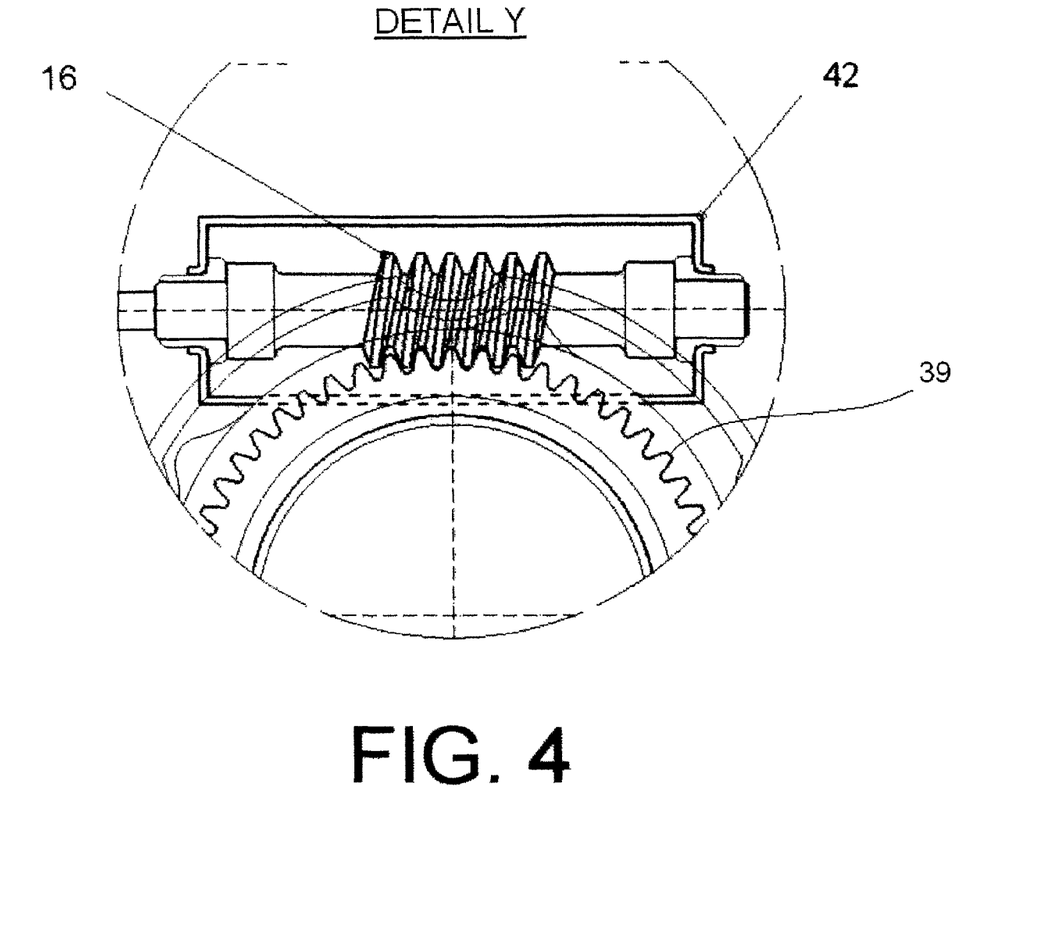
FIG. 4 is a detail view of region Y of FIG. 1 showing the gear train used in the invention.

Referring again to FIGS. 1 and 4, the entrainment of the teeth 39 of the linking ring 20 by the Worm 16 connected to the motor 12 is shown. The use of the frame 42 protects the system 10 from the introduction of debris and creates a reservoir to retain lubricant to insure the smooth operation and long life of the system.

I. Modes of Operation: Embodiment 1

The electrical operation of the system 10 will be described first. For security reasons, the system 10 does not function when the vehicle's ignition is on.

a. Electrical Opening—Embodiment 1

To unlock the fueling door 46, the driver pushes a knob (not shown) preferably located on the vehicle's dashboard. Any remote control system or other command system can be substituted for the knob. Upon unlocking, an LED (not shown) on the dashboard or, alternatively, on the knob, is illuminated until such time that the cap 26 and the fueling door 46 are locked again, after the fuel tank has been filled up.

Referring again to FIG. 1, pushing a knob on the dashboard (or using any other command system) disengages the latch of the trap door 46 and activates the electric motor 12. The force of the magnet 32 (or any other equivalent system) that fixes the cap 26 to the trap door 46 being greater to that of the spring (or any other similar system) of the trap door 46, the trap door 46 stays closed while the thread 39 of the cap 26 is engaged with a corresponding structure of the linking ring 20.

The electric motor 12 drives a worm 16 which is in contact with the lower toothed part of the linking ring 20 and also turns the latter. While turning, the linking ring 20 separates from the cap 26. The cap 26 is fixed to the trap door 46 and does not move.

As the ring 20 disengages from the cap 26, the ring rides slightly down the filling tube 34 and compresses the coil spring 30. At the moment that the cap 26 is disengaged from the linking ring 20, the spring 30 is compressed. In addition, at that moment, the cap 26 is no longer engaged with the linking ring 20 and the trap door 46 opens via a torsional spring 90 which biases the hinge 22. The motor 12 stops by virtue of a command given by a position sensor (not shown), a switch indicating whether the trap door 46 is open, or simply after a defined rotation of the linking ring 20. The trap door 46 drives the cap 26 that is fixed to it by holding it against rotation and allowing it to move along the axis of the filling tube 34, thus freeing the filling tube for filling the tank with fuel.

The spring 30 then finds its relaxed or rest position again. This causes the linking ring 20 to return to top of the filling tube 34 in a manner that the cap 26 and the linking ring 20 will be in contact again, ready for the closing phase.

While the spring 30 is in its relaxed position, the anti friction bearing 36 (optional) minimizes friction between the linking ring 20 and the top of the filling tube 34.

Again, the stopping and starting of the motor 12 in the opening phase and closing phase, respectively, are defined by the position sensor, by mechanical limits combined with slip clutches, or by the opening of the rap door 46 or any equivalent system.

b. Electrical Closing—Embodiment 1

Once the fuel tank is filled and the fuel dispenser replaced on the gas pump, the driver needs only to push the opened fueling door 46 to initiate the closing phase. Of course, the closing phase may be initiated via a remote control system having a control interface on the dashboard or on the key, for example.

Note that the cap 26 is generally always attached to the fueling door 46 and is positioned relative to the filling tube 34 and linking ring 20 so that its threads 28 comes into contact with the threads 29 of the linking ring when the fueling door is closed.

During the closing of the trap door 46, the amount of bias and thus the contact between the cap 26 and the linking ring 20 may be optimized by the selection of spring coefficient or other characteristics of the spring 30.

By means, for example, of the position sensor, the closing of the trap door 46 initiates the driving of the electric motor 12 in a reverse rotation as compared to that or the opening phase. The position sensor may likewise give the order to lock the trip door 46 via a latch 45.

The electric motor 12 drives the worm 16 which is in contact with the teeth 38 of the linking ring 20 and also turns the latter in reverse according to the opening phase or the position of the linking ring along the axis of the filling tube 34. While turning, the linking ring 20 reengages with the cap 26. The cap 26 is fixed to the trap door 46 in a recess which engages the bosses 26a' in a manner that does not permit relative rotational movement of the cap with respect to the trap door.

As the linking ring 20 engages with the cap 26, the linking ring 20 rides up the filling tube 34 until engagement is complete and the seal watertight.

The electric motor 12 automatically stops when the torque limit of the motor is reached making further turning of the linking ring 20 impossible. The spring 30 is then in its most extended position.

When the closing phase of the system 10 is complete and a watertight seal is obtained, the light indicator of the dashboard (optional) goes out, indicating that the user can start the car and drive in complete safety.

c. Manual Opening—Embodiment 1

The user may manually unlock the fueling door 46 via a manual unlock, which may be redundant to or in place of the electrical unlocking system. This remote system may be located within reach of the driver in a driver's seat or in the trunk or proximate the fueling door 46, as best suits the purpose of the manufacturer.

In a unique feature of the system 10, once the trap door 46 is unlocked, the user may manually remove the cap 26. The cap 26 is simply manually disengaged from the linking ring 20 to which it is still attached by turning the cap in a conventional manner. Further, during fueling, the cap 26 can be attached to the opened fueling door 46 via the magnet 32 or "VELCRO"™ attachment.

d. Manual Locking—Embodiment 1

Then, after the fuel tank has been filled, the user can remove the cap 26 from the trap door 46 by manually breaking the magnetic bond, and then engage the cap 26 on the linking ring 20. He then turns the cap 26 until full engagement is reached, indicated when alignment marks 47, one on the cap, and another on adjacent the filling tube 34, line up. Alternately, the cap 26 may have a knurled outer surface 26', which is designed such that the cap and the guidance sleeve 24 can be in any orientation with respect to each other.

The user closes the trap door 46 and the cap 26 again finds its place in the guidance sleeve 24.

Note that the potential problem of alignment of the cap 26 with the guidance sleeve 24 can easily be overcome by increasing the angular range of possibilities for interlocking by decreasing the angular positions in which interference is possible. For example, only a small number of small bosses 26a need be formed on the outer gripping surface 98 of the cap 26, in which the guidance sleeve has corresponding (or fewer in number) bosses which engage with the bosses 26a of the cap, but only after a certain amount of angular rotation of the cap. Further, when the system 10 uses a bayonet thread 39 which cams to a set arrest and locked position, then there is only one definitive closed position, thus obviating any problem at all in ensuring the alignment of bosses 26a on the cap 26 with corresponding features in the guidance sleeve 24 of the trap door 46 (although the cap must, in the case of a traditional bayonet system, be actuated axially prior to being actuated rotationally, to move the bayonet mechanism to a freely rotational position, wherein adding the additional actuation is within the skill of one of ordinary skill in the art).

Figure 5A:
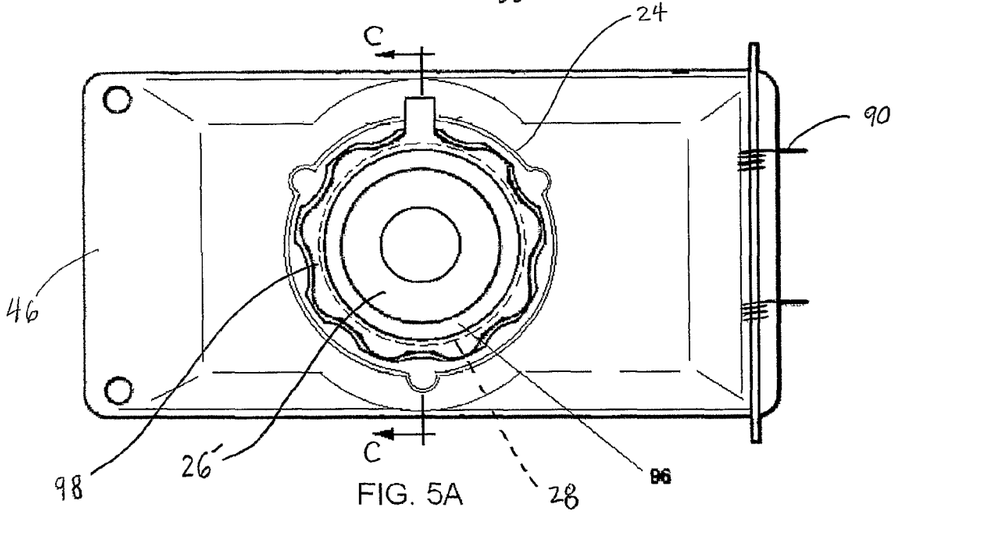
FIGS. 5a is a front view of the trap door with the cap attached of the invention.
Figure 5B:
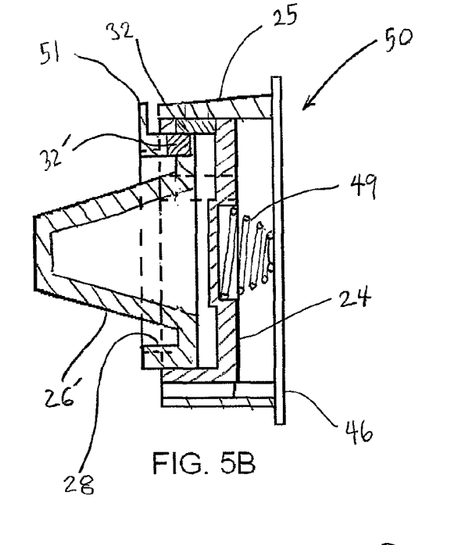
FIGS. 5b-5c are cross-sectional side views taken along line C-C of FIG. 5a, showing the operation of a cap alignment device of the invention.
Figure 5C:
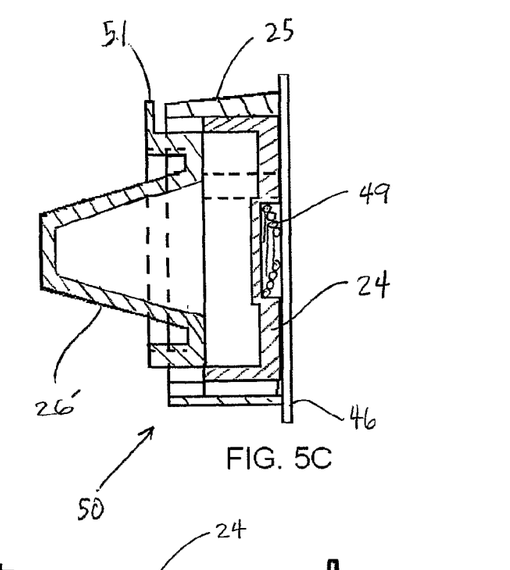

Referring now to FIGS. 5a-5c, still further, in an alignment device 50, where the guidance sleeve 24 is made to move axially but non-rotationally (i.e, it is keyed against rotation in a receiver 25) relative to the filling tube 34, a small amount in the receiver 25 in the trap door 46, and biased by a spring 49 toward the cap 26', then any potential alignment problem is completely obviated. This is due to the fact that, if the cap 26' and guidance sleeve 24 are not completely aligned at closing, the guidance sleeve simply is pushed further into the receiver 25 in the trap door 46, allowing full closing thereof. Then, at the first actuation of the ring 20, the guidance sleeve 24 is then biased into full engagement with the cap 26' and the actuation of the cap can proceed normally. Optionally, a tab 51 is provided on the cap 26' to facilitate removal from the receiver 25. Further, magnets 32 and corresponding ferromagnetic elements 32' are provided to hold the cap 26' in the guidance sleeve 24 in place in the receiver 25 of the trap door 46, until such time as the user draws it out manually or the system 10 actuates the cap to close the fuel tank. FIG. 5B shows the cap 26' fully engaged in the guidance sleeve 24, in a manner which permits the ring 20 to move relative thereto. FIG. 5C shows the device 50 in a position just prior to engagement, such as when the trap door 46 is closed when the cap 26' and guidance sleeve 24 are not initially aligned. Only a small amount of relative rotational movement of the cap 26' permits the cap and boot to align and then engage for actuation.

Figure 5D:
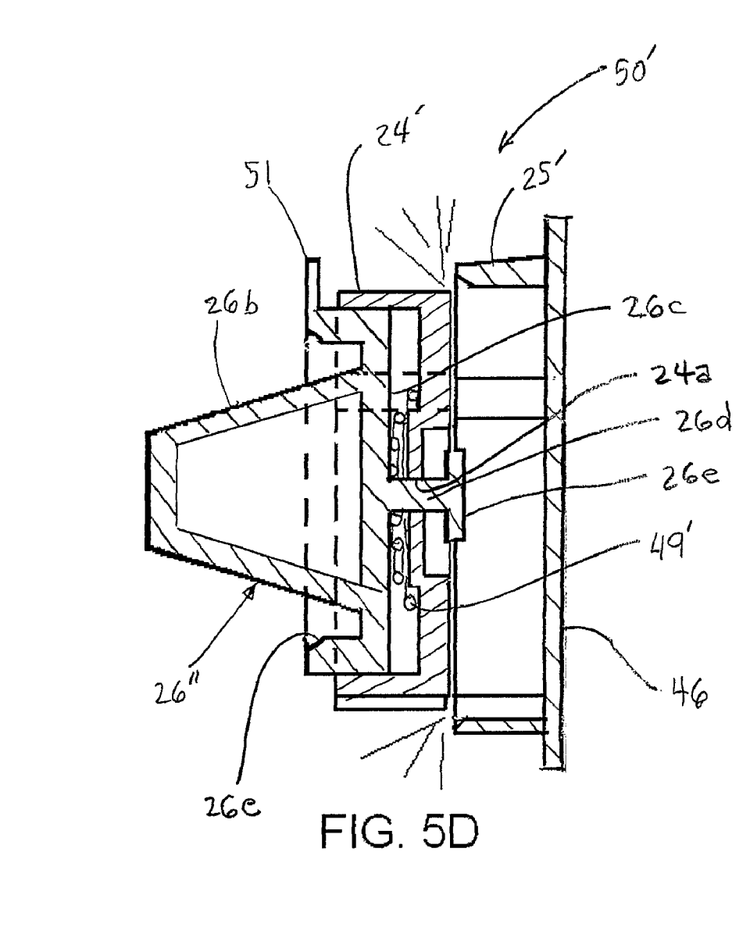
FIG. 5d-e are cross-sectional side views taken along C-C of FIG. 5a, showing the operation of a cap alignment device of the invention in which the grounding of components is reversed.
Figure 5E:
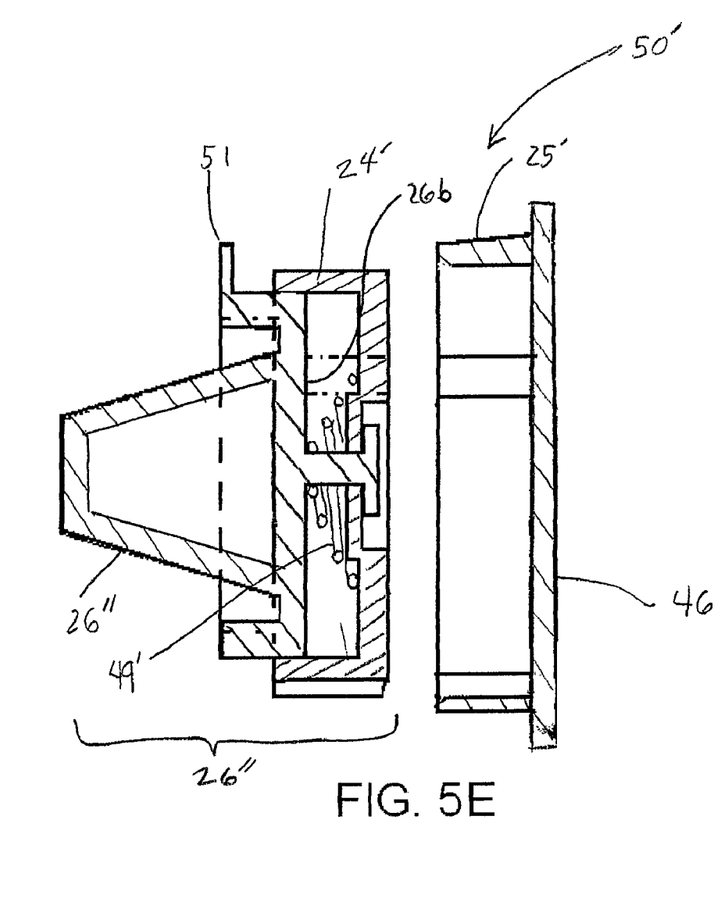

Referring now to FIGS. 5d and 5e, an alternate alignment device 50' reverses the grounding of some components, making the guidance sleeve 24' an exterior sleeve and part of the cap assembly 26" (made up of a cap body 26b, a spring 49' and the boot 24'). As before, this boot 24' is keyed against rotational movement in the receiver 25' but may be completely removed therefrom. The spring 49' is interposed between the guidance sleeve 24' and the boot-facing surface 26c of the cap body 26b. The assembly 26" may be held together via a post

26d having a boss 26e, of a size larger than a hole 24a in the boot 24' which prevents the boot 24' from coming off the cap body 26b.

Of course, the cap 26 may optionally screw on to an outside thread of the filling tube 34. Conversely, the linking ring 20 may optionally engage to an external thread (of bayonet system or other suitable system) of the gas cap 26.

The locking and the unlocking of the cap 26 on the linking ring 20 does not depend on the number of turns or fractional turns for locking and unlocking the system 10 and does not depend on the direction of rotation. Other systems of locking or unlocking of the cap (as for example electromagnetic, pneumatic, via a clamping device, etc.) can be conceivable.

One or more of the components of the system 10 may be designed to yield in the event of a shock or crash so as to better ensure that the cap 26 remains hermetically fixed on the fuel tank.

The locking and the unlocking of the fueling door 46 can be assisted by one or more hydraulic or pneumatic cylinders, one or more of which may also have a shock absorbing function, in order to dampen movement and to make the process less abrupt.

The positioning of one or more electric motors or of different related components that actuate the locking and unlocking of the cap 26 may be varied widely.

The position of the gas cap 26 its angle and its shape are variable. The orientation of the magnets 32 in the guidance sleeve 24 and any corresponding metallic components(s) in or on the cap 26 can of course be reversed.

II. Modes of Operation—Embodiment 2

Figure 6:
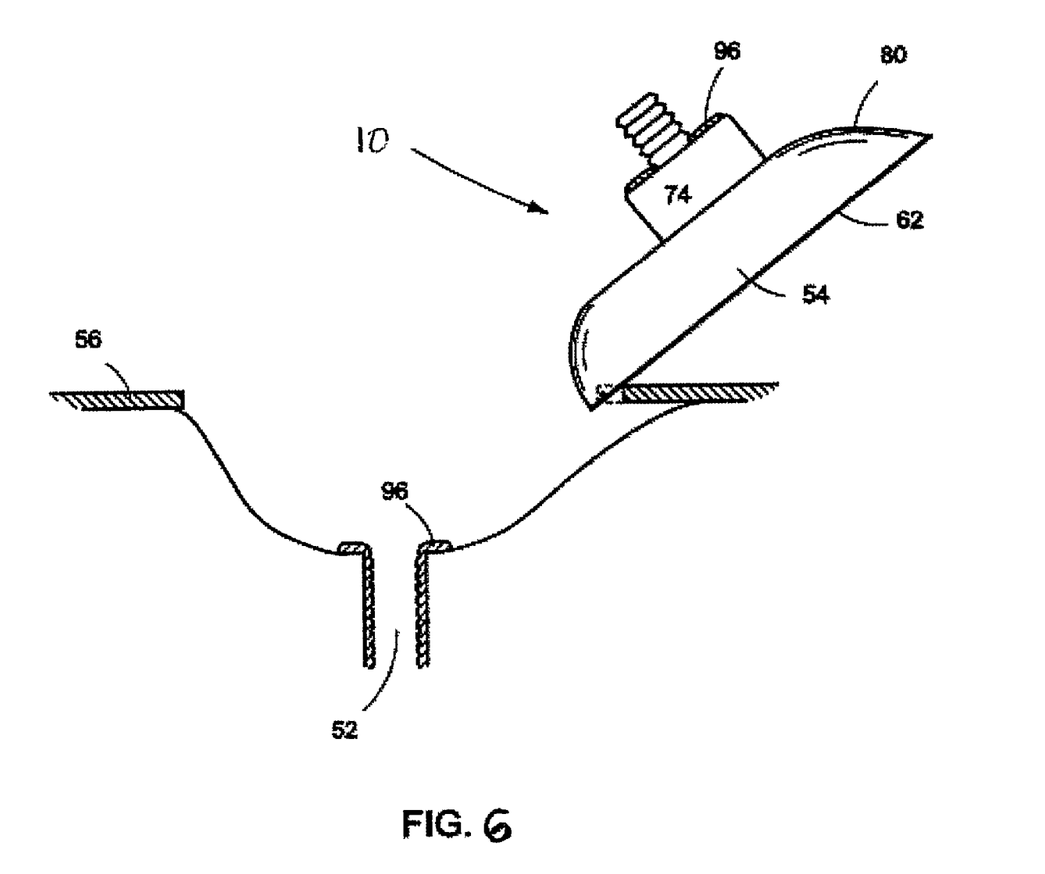
FIG. 6 is a top, schematic view of the actuator of an alternate embodiment of the invention, with the fuel door open.

Referring now to FIG. 6, in another embodiment a system 10' is provided which includes an automatic gas cap actuator assembly 54, a gas cap 74, and an orifice or filling tube 52. The automatic gas cap actuator assembly 54 automatically locks and opens the gas cap 74 (shown in FIGS. 9a, 9b, 10 and 11) of a vehicle's fuel tank. The actuator assembly 54 is hinged to the body 56 of the vehicle.

Figure 7A:
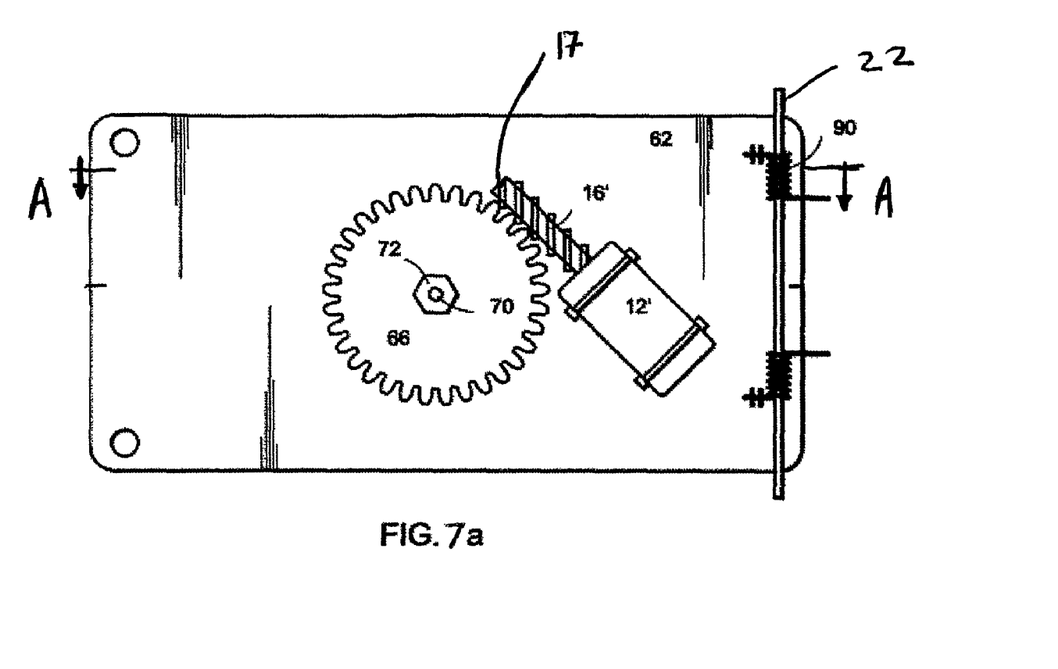
FIG. 7a is a front view of the inside of the fuel door assembly of the alternate embodiment of the invention.

Referring now to FIG. 7a, the actuator assembly 54 is made up of a gas cap interface 72 formed on a disc 66 which is essentially a ring gear and a hub. The interface 72 releasably mates with the gas cap 74 such that the cap can be disengaged from the actuator assembly 54 for manual closing of the fuel tank. A reversible electric motor 12' carries a worm 16' which interfaces with the worm gear 66. Note that the teeth of the worm 16' may be made up of the winds of a coil spring, which aids in absorbing shock when the spring is connected to the shaft 17 only at one or both ends of the shaft. A control system (not shown) having a switch (not shown) within reach of a vehicle operator actuates the electric motor 12'.

In an advantage, the cap 74 can be locked or opened both electrically and manually. Using the electrical unlock, the cap 74 unlocks and the gas cap opens without requiring manual intervention. Thus, using the invention, the user finds the orifice 52 leading to the gas tank already open and ready for the insertion of the pump's filling tube. This guarantees a less time consuming and more cleanly filling operation. When fueling is complete, all that is necessary is that the fueling door 62 (which is spring biased and/or pneumatically biased open), be closed to begin the actuation of the gas cap 74 to its closed position.

The driver needs only to touch the exterior fueling door 62 and not the normally soiled cap 74. The closing can take place automatically as well, initiated via a remote command from the dashboard.

a. Electrical Operation—Embodiment 2

The electrical operation of the system 10' will be described first. For security reasons, the system 10' does not function when the vehicle's ignition is on.

b. Electrical Opening—Embodiment 2

To unlock the fueling door 62, the driver pushes a knob (not shown) that is on the vehicle's dashboard. Upon unlocking, a LED (not shown) on the dashboard or, alternatively, on the knob, is illuminated until the cap 74 and the fueling door 62 are locked again, after the fuel tank has been filled up.

Figure 7B:
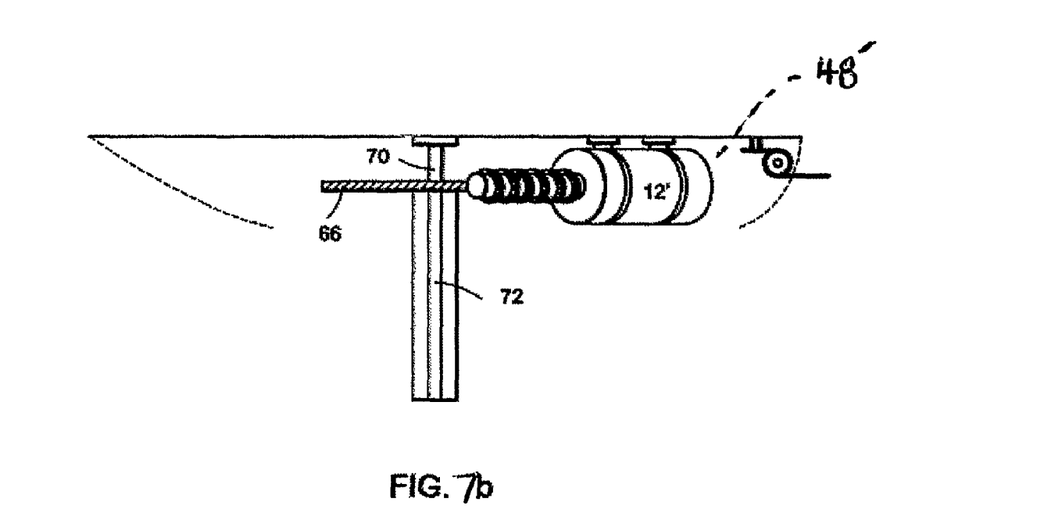
FIG. 7b is a top, cross-sectional view taken along line A-A of FIG. 6a of the actuator of the alternate embodiment of the invention.

Referring now to FIGS. 7a and 7b, pushing on the knob situated on the dashboard activates the electric motor 12' fixed to the interior part of the fueling door 62. This electric motor 12' turns a worm 16' that causes the worm gear 66 fixed on the interior surface of the fueling door 62 to rotate about an axis or spindle 70 which is generally perpendicular to the plane of the fuel door 62. This worm gear 66 has a polygonal, flexible, male hub 72 a few centimetres long that interfaces with the cap 74 via a female recess 76 (shown in FIG. 9b) of corresponding shape 72. It should be noted that due to the requirement of flexibility of the hub 72 (due to the misalignment with the cap which occurs on opening of the trap door 62), and the general requirement of rigidity for the worm gear 66, the two may be made of different materials and connected together in any appropriate manner known in the art.

Figure 8A:
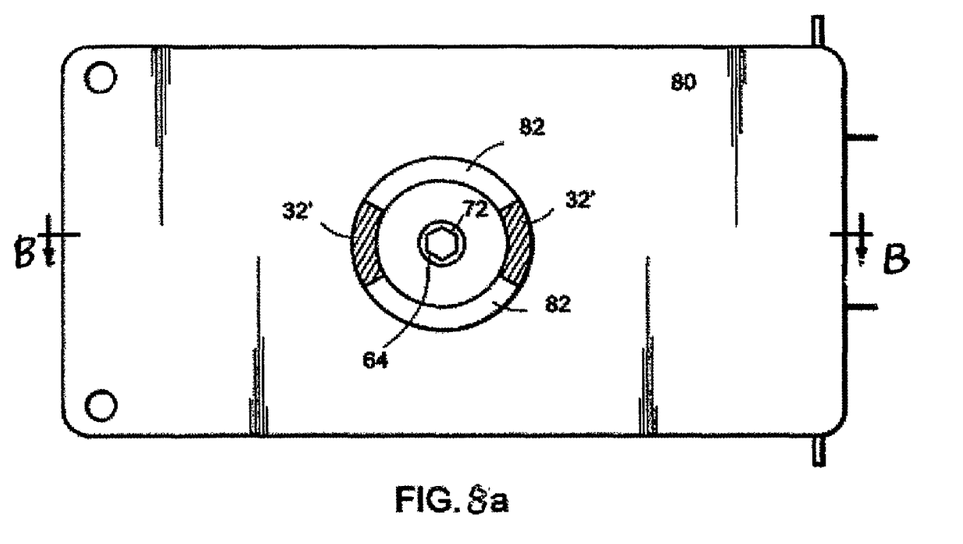
FIG. 8a is schematic front view of the inside of the fuel door assembly of the alternate embodiment of the invention, showing the positioning of magnets in a cowling.
Figure 8B:
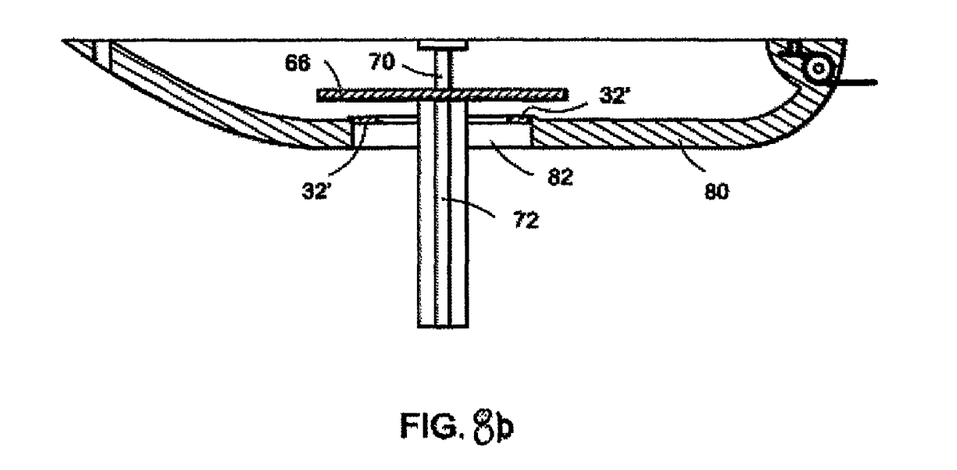
FIG. 8b is a top, cross-sectional view taken along line B-B of FIG. 7a of the actuator of an alternate embodiment of the invention.

Referring now to FIGS. 8a-8b, a cowling 80 fixed on the interior part of the fueling door 62 covers the mechanism. On the visible part of this cowling 80, a recess 82 of a few millimeters or centimeters in depth is formed. Magnets or electro-magnets or ferromagnetic material 32' (or any other equivalent fixation system) are disposed adjacent to the base of this recess 82. At the center of the recess 82, an opening 64 allows for the hub 72 that interfaces with the cap 74 to pass.

The attractive force of the magnets 32' must be sufficiently strong to retain the cap 74 on the actuator assembly 54, but also weak enough to enable the user or driver to easily detach the cap when manually manipulating the cap as well as well as when the cap is being automatically screwed on to the filling tube.

Figure 9A:
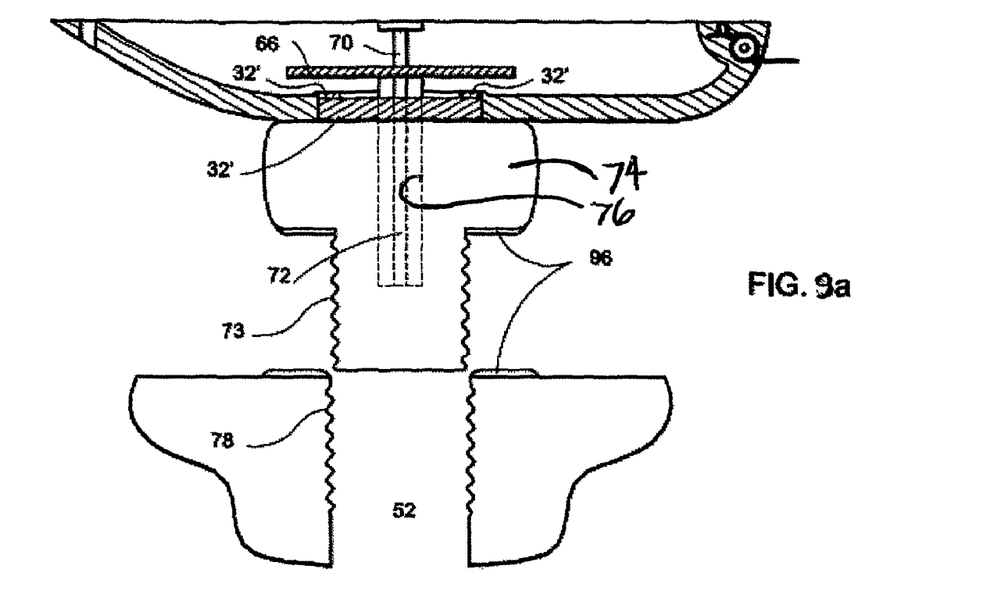
FIG. 9a is a top, cross-sectional view of the actuator of the alternate embodiment of the invention, in an open position.
Figure 9B:
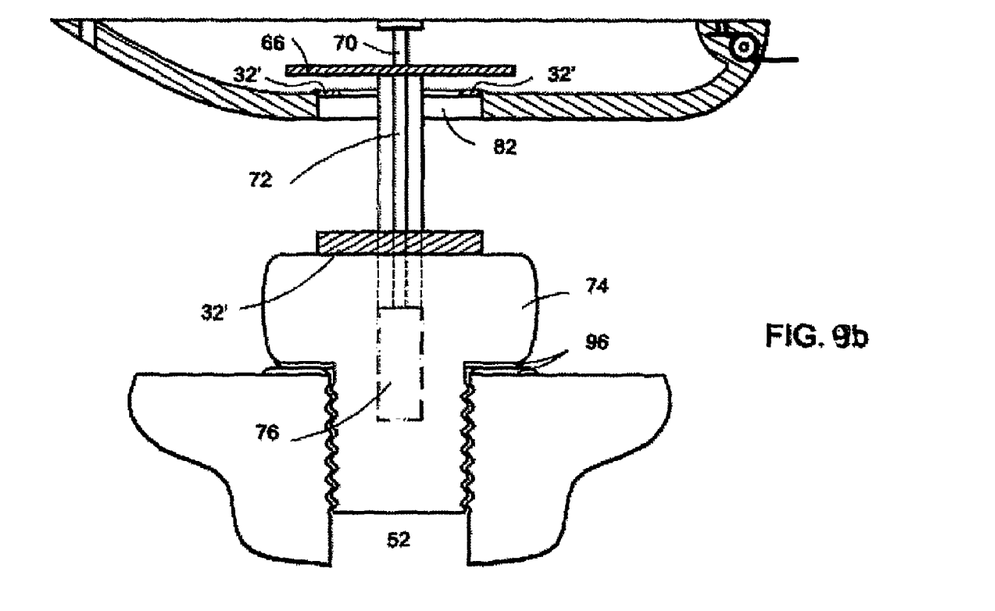
FIG. 9b is a top, cross-sectional view of the actuator of the alternate embodiment of the invention, in a closed position.

Referring now to FIGS. 9a-9b, the cap 74 has a blind central hole 76 to slidingly and progressively receive the hub 72 of the worn gear 66 so as to engage the cap when the fuel door 62 is closing Optionally, a spring (not shown) attached over the hub 72 biases the threads 73 of the cap 74 into engagement with the threads 78 of the filling tube 52, the force of such bias being less than the retaining force of the magnets 32' on the cap.

Figure 10:
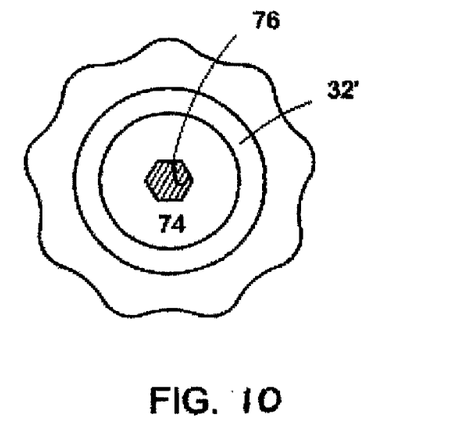
FIG. 10 is a front view of the cap of the actuator of the alternate embodiment of the invention.

Referring also to FIG. 10, a metallic ring (magnetic, electro or ferro magnetic) 32' is molded into the upper portion of the cap 74 or fixed on it so as to react with the magnets to retain the cap on the cowling 80. This metallic ring 32' is sized slightly smaller in diameter than the recess in the cowling 80. The use of magnets 32' permits the cap 74 to be removed manually and then manually threaded into the filling tube 52. Thereafter, the fueling door 62 may be manually closed and locked. In this way, the invention provides redundant actuation: manual as well as automatic closing is possible.

The hub 72 of the worm gear 66 imparts rotational motion to the cap 74. The cap 74 may slide along the rod 72 until its metallic ring 32' enters the recess 82 of the cowling 80. The contact of the metallic ring 32' of the cap 74 with the magnets 32' located in the base of the recess 82 of the cowling 80 does the following:

(1) activates one or more contacts whose function is to toggle the electric motor 12' off (thus terminating the cap's rotation), (2) activates one or more contacts whose function is to unlock the fueling door 62 and (3) fixes the cap 74 on the fueling door 62 by magnetisation during the process of filling up the fuel tank.

Once the fuel door is unlocked (preferably remotely) and the cap rotated out of engagement with the filling tube 52, the fueling door 62 opens automatically, thanks to springs 90 which bias the trap door 46 to open when unlocked. Hydraulic or pneumatic cylinders may be used in the mechanism, as supplemental components to or substitutes for the springs 90 which bias the fueling door open and/or act as shock absorbers thus assisting in and dampening the opening of the fueling door 62, in order to take this process less abrupt. In an alternative embodiment which makes the opening action less abrupt, the hub 72 may be made separate from the worm gear 66 so as to permit it to be rotated through a limited angle with respect to the worm gear 66 against a torsion spring bias, in order to enable torque to gradually build up on the cap 74 to the point where the cap begins to unscrew from the filling tube 52.

After remote actuation to open the filling tube 52 from within the vehicle, the driver finds the fuel door 62 opened and ready to receive fuel. The fuel tank's cap 74 is magnetically retained on the fuel door 62. The filling tube or orifice 52 is opened and is ready to receive the fuel dispenser without it being necessary that the driver manually open or unlock the cap 74.

c. Electrical Locking—Embodiment 2

Once the fuel tank is filled and the dispenser replaced on the gas pump, the driver needs only to push the opened fueling door 62 to close it. Closing via a remote control system having a control interface on the dashboard or on the key for example, is also possible.

Note that the cap 74 is generally always attached to the fueling door 62 and is positioned so that its end comes into contact with the mouth and indeed the threads 78 of the filling tube 52 when the fueling door is closed.

By means of a position sensor (not shown), the action of closing the fueling door 62 causes the electric motor 12' to turn in the opposite direction from the opening direction. The motor 12' creates a torque lower than that used in the unlocking phase, in a way which ensures that the force available to open the cap is always greater than the closing torque; thus ensuring that the cap 74 can always be opened by the electric motor 12'.

Once the electric motor 12' is turned on, the hub 72 of the worth gear 66 (already engaged with the cap 74) causes the cap to rotate. The metal ring 32' of the cap 74 then detaches from the magnets 32' of the base of the recess 82 of the cowling 80. The cap 74 in the process of screwing into the threads 78, slides along the rod 72. As necessary, the rod 72 bends to accommodate the changing axial orientation as the fuel door 62 closes.

The electric motor 12' automatically stops when the torque limit of the motor is reached making further turning of the cap 74 impossible. This indicates that the cap 74 is correctly installed in the filling tube 52 of the fuel tank. A leak proof seal is guaranteed by the circular elastomeric washers 96 (or any equivalent system) on either the cap or the filling tube 52 or both.

A contact activated by the stopping of the motor 12' (or equivalent system) toggles the power supply to the motor off and thus causes the light on the dashboard to go out. The driver is informed about the fact that the operation is finished and can start and drive the vehicle.

d. Manual Opening—Embodiment 2

Figure 11:
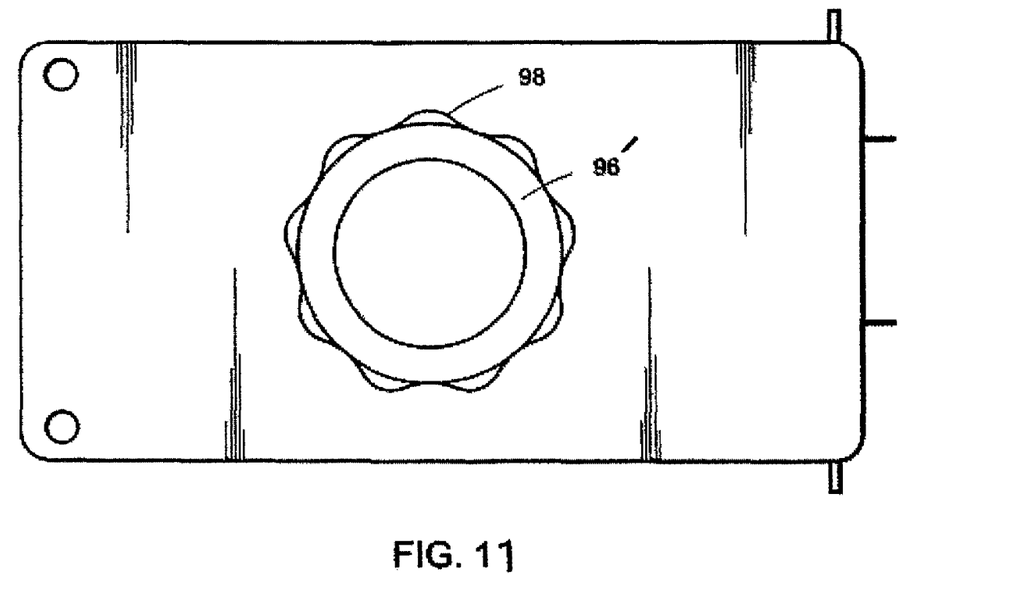
FIG. 11 is a front view of the inside of the fuel door of the alternate embodiment of the invention, with the cap attached.

Referring to FIG. 11, the driver may manually unlock the fueling door 62 via a manual unlock, which may be redundant to or in place of the electrical unlocking system. This remote system may be located within reach of the driver in a driver's seat or in the trunk or proximate the fueling door, as best suits the purpose of the manufacturer. The fueling door opens as the spring force biasing the door open is greater than the retaining force of the magnets 32' to the top of the cap 74.

Once the fueling door 62 is opened, the cap 74 can be manually unscrewed via gripping on the knobbed circumference 98, in the same way in which a gas cap of the prior art is unscrewed.

During fueling, the cap 74 can be attached to the fueling door 62 via the magnets 32 and ring 32'.

e. Manual Locking—Embodiment 2

After the fuel tank has been filled, the user can remove the cap 74 on the actuation assembly by manually breaking the magnetic bond, and then turning the cap into the fueling tube 52 as with any conventional manual system. Then, he guides the end of the flexible hub 72 into the recess 76 and closes the fueling door 62.

Further, the cap 74 may optionally screw on to an outside thread of the filling tube 52.

The system 10, 10' is preferably independent of the central locking system of the vehicle.

The light placed on the dashboard (optional) indicates that the system 10, 10' is working, but it may also have the purpose of preventing the driver from driving the car when there is a system failure or when the gas cap 26 is open.

As with a conventional fuel cap, the cap 26, 74 may or may not include a security valve for gas ventilation.

In an advantage, the cap 26, 74 can be locked or opened both electrically and manually.

In another advantage, using the electrical unlock, the cap 26, 74 unlocks and the fueling door 46, 62 opens without necessitating manual intervention.

In another advantage, using the invention, the user finds the orifice 34, 52 that leads to the gas tank already open and ready for the insertion of the pump's filling tube. This guarantees a less time consuming and cleanly filling operation.

In another advantage, when fueling is complete, all that is necessary is that the fueling door 46, 62 be closed to begin the actuation of the gas cap 26, 74 to its closed position.

In another advantage, the locking and the unlocking of the cap on the fuel tank circuit do not depend on the number of turns or fractional turns for locking and unlocking the system 10, 10'.

An object of the invention is to provide a simple, hygienic, and redundant manual and electrical system for opening or closing a fuel tank's gas cap.

Multiple variations and modifications are possible in the embodiments of the invention described here. Although certain illustrative embodiments of the invention have been shown and described here, a wide range of modifications, changes, and substitutions is contemplated in the foregoing disclosure. For example, the cap may be fixed to the filling tube 34, 52 via a clamping device which clamps over the threads. The positioning of one or more electric motors or of different related pieces that actuate the cap's locking and unlocking may be varied. The position of the opened gas cap, its angle and its shape are, of course variable. The orientation of the magnets 32 and the metallic ring 32' can of course be reversed. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. A gas cap actuator system (10, 10') which actuates automatic dosing and opening of a gas cap (26, 26', 26", 74) on a filling tube (34, 52), the system having: a. a gas cap (26, 26', 26", 74); and b. a cap actuator (16, 20, 48, 48', 72) actuated by a non-manual power source (12, 12') and which interfaces with the gas cap (26, 26', 26", 74) via an interface (39, 76) in a manner so as to be able to impart relative rotation between the gas cap and a fixing element (20, 78), so as to draw the cap into engagement with the filling tube (34, 52), the interface and the gas cap being manually disengageable so as to permit manual use at the will of the operator.

2. The gas cap actuator system (10, 10') of claim 1, wherein the non-manual power source is selected from a group of non-manual power sources consisting of electrical, pneumatic, and hydraulic power sources (12, 12').

3. The gas cap actuator system (10) of claim 1 wherein the fixing element is a driveable ring (20) having a diameter greater than the diameter of the filling tube (34) and disposed so as to slidingly and rotatably fit around an end of the filling tube (34), which the non-manual power source (12) actuates to rotate about an end of the filling tube (34) so that when the gas cap is properly aligned with the ring, the ring draws the gas cap into sealing engagement with a rim (97) of an opening of the filling tube (34) so as to seal the gas cap.

4. The gas cap actuator system (10) of claim 3, wherein an external periphery of the ring (20) has teeth (38) which engage with a worm (16) driven by the motor (12), an external face of an opposite end comprising a thread (39) for interfacing with the cap (26, 26', 26"), the thread (39) making connection between the cap (26, 26', 26') and the filling tube (34) by turning, in order to permit automatic opening and closing of the tank.

5. The gas cap actuator system (10) of claim 4, wherein a quick connection and release device (32, 32') is provided and disposed between the trap door (46) and the cap (26, 26') or cap assembly (26").

6. The gas cap actuator system (10) of claim 4, wherein the cap (26, 26', 26") is attached to the trap door (46) by magnetic means (32, 32').

7. The gas cap actuator system (10) of claim 4, wherein the cap (26, 6', 26") is attached to the trap door (46) by a hook-and-loop fastener interface (75).

8. The system of claim 4, wherein the motor (12) drives the worm (16) which drivably interfaces with and is held in operational relationship to the ring (20) by a frame (42).

9. The system of claim 4, wherein rotation of the thread (39) on the ring (20) permits the opening and closing of the system (10) by disengaging and engaging the ring (20) from and with the cap (26, 26', 26") without having to physically turn the cap.

10. The system of claim 4, wherein the ring (20) is interposed between the cap (26, 26', 26") and a coil spring (30), which biases the ring into contact with the cap (26, 26', 26") and permits the ring to axially move along the filling tube (34) between stops (35, 37) which define the limits of motion of the cap.

11. The gas cap actuator system (10) of claim 3, wherein a portion of the cap (26, 26', 26") which penetrates into the ring (20) has a chamfer (26f) so as to facilitate the interfacing of the ring (20) in the event that the cap is not properly aligned with the ring.

12. The gas cap actuator system (10) of claim 3, wherein, when the cap (26, 26', 26") is freed from the thread (39) and thus from the ring (20), the trap door (46), with the cap (26, 26', 26") fixed to it, opens via a spring (90) associated with a hinge (22) and frees the filling tube (34) to enable fueling.

13. The gas cap actuator system (10) of claim 3, wherein, when a user closes a trap door (46), the cap (26, 26', 26") engages on the thread (39) of the linking ring (20) which, driven by the motor (12), drives the system (10') to a locked configuration.

14. The system of claim 3, wherein a low friction o-ring seal (36) protects the filling tube (34) from an upper part of the linking ring (20) as well as helps to seal the system (10).

15. The system of claim 3, wherein a frame (42) protects the system (10) from the introduction of debris and creates a reservoir to retain lubricant to insure the smooth operation and long life of the system.

16. The system of claim 3, wherein an alignment device (50, 50') having the purpose of compensating for any misalignment of a floating guidance sleeve (24) and the cap (26, 26', 26"), comprises the guidance sleeve (24), a spring (49) and a receiver (25) mounted on a trap door (46), the guidance sleeve being able to move axially and non-rotationally relative to the filling tube (34) by virtue of being keyed to the receiver (25) fixed to the trap door (46), and biased by the spring (49) toward the cap (26'), thus permitting the guidance sleeve (24) to be biased into engagement with the cap such that closing the trap door (46) is permitted even when alignment would otherwise prevent closing and such that, engagement of the guidance sleeve (24) is made with the cap (26, 26', 26") is accomplished after an initial rotation of the cap with respect thereto.

17. The system of claim 16, wherein the guidance sleeve (24) is a component of a cap assembly (26").

18. The gas cap actuator system (10') of claim 1, wherein the fixing element is a worm gear (66) having a hub (72) which engages with the cap (74) so as to be able to rotate the cap.

19. The gas cap actuator system (10, 10') of claim 1 wherein the cap (26, 26', 26", 74) is retractably attached to a fueling door (46, 62) in a manner so as to permit manual removal of the cap from the door.

20. The gas cap actuator system (10) of claim 1, wherein the cap (26, 26', 26") is formed to include an external gripping surface (98) having bosses (26a) that facilitate opening by hand and which further lock the cap into a guidance sleeve (24).

* * * * *

UNITED STATES PATENT AND TRADEMARK OFFICE
CERTIFICATE OF CORRECTION

PATENT NO. : 8,382,187 B2
APPLICATION NO. : 10/596005
DATED : February 26, 2013
INVENTOR(S) : Naim Guendouz et al.

Page 1 of 1

It is certified that error appears in the above-identified patent and that said Letters Patent is hereby corrected as shown below:

In the Specifications

In Col. 3, line 59, replace the phrase "bit a frame 42. The" with --by a frame 42. The--

In Col. 3, line 61, replace the phrase "Referring now Lo FIGS." with --Referring now to FIGS.--

In Col. 9, line 52, replace the phrase "worth gear 66" with --worm gear 66--

In Col. 11, line 15, replace the phrase "matic dosing and opening" with --matic closing and opening--

Signed and Sealed this
Seventh Day of May, 2013

Teresa Stanek Rea
*Acting Director of the United States Patent and Trademark Office*